(12) United States Patent
Mochizuki et al.

(10) Patent No.: US 7,849,527 B2
(45) Date of Patent: Dec. 14, 2010

(54) TOILET APPARATUS WITH PROCESSING MATERIAL

(75) Inventors: Shinobu Mochizuki, Tokyo (JP); Koutarou Nishida, Tokyo (JP)

(73) Assignee: Nihon Safety Co., Ltd., Tokyo (JP)

( * ) Notice: Subject to any disclaimer, the term of this patent is extended or adjusted under 35 U.S.C. 154(b) by 442 days.

(21) Appl. No.: 12/003,815

(22) Filed: Jan. 2, 2008

(65) Prior Publication Data

US 2009/0165196 A1    Jul. 2, 2009

(51) Int. Cl.
*A47K 11/06*    (2006.01)

(52) U.S. Cl. .................................................. 4/484

(58) Field of Classification Search ............. 4/484
See application file for complete search history.

(56) References Cited

U.S. PATENT DOCUMENTS 3,665,522 A * 5/1972 Backlund et al. ............ 4/484
5,753,246 A * 5/1998 Peters ....................... 424/404
6,202,224 B1 * 3/2001 Freeman .................... 4/144.2
2009/0044325 A1 * 2/2009 Sell ........................... 4/484

* cited by examiner

*Primary Examiner*—Charles Phillips
(74) *Attorney, Agent, or Firm*—Kratz, Quintos & Hanson, LLP

(57) ABSTRACT

A toilet apparatus is adapted to put the excrement produced each time by the user of the toilet into a bag to form a package of waste, treating the excrement into a state of combustible substance before putting it into a bag. The toilet apparatus is equipped with a long, flexible and folded continuous cylindrical member set in position below a toilet seat as packaging member that is adapted to receive the excrement produced by the user each time and become sealed and transferred downward in the toilet bowl, a processing material for absorbing liquid and semi-solidifying the excrement being arranged at a side of the toilet apparatus, a quantity of the processing material being fed into the packaging member for receiving the excrement each time of production of excrement so as to absorb liquid from the excrement, the packaging member being subsequently sealed at an opening thereof.

13 Claims, 3 Drawing Sheets

RELATED ART

TOILET APPARATUS WITH PROCESSING MATERIAL

BACKGROUND OF THE INVENTION

1. Field of the Invention

This invention relates to a toilet apparatus with a processing material that can be used in hospitals, care facilities and houses and with a processing material adapted to put the excrement produced each time by the user of the toilet into a bag to form a combustible package of waste.

2. Description of the Related Art

Toilet apparatus that can be used in various facilities such as hospitals and houses and is adapted to process the excrement produced each time into a bag to form a package of waste are known from Patent Documents 1 through 5 including JP-A-49-102167, JP-A-06-30857, JP-A-07-275162, JP-A-2004-261530 and JUM (?)-08-5921. Some of such toilet apparatus are put into practical use.

Such toilet apparatus are very practical and highly evaluated by users because they can be installed at bedsides of ailing people who need nursing care so that the ailing people can use the apparatus at the bedside and the excrement produced each time is package into a bag to form a substantially perfectly sealed package. The only problem such toilet apparatus have is that the packages of excrement cannot be disposed readily with ease because of various restrictions imposed by waste control regulations.

However, such toilet apparatus can find more applications if the package formed by putting the excrement produced each time into a bag can be handled as ordinary combustible waste because anyone can dispose such a waste with ease. The packages of excrement produced from known package type toilet apparatus cannot be handled as ordinary combustible waste probably mainly because the liquid content of the package takes a large ratio, in other words the package contains liquid too much, so that it cannot be burnt easily without further treatments.

In view of the above-identified circumstances, it is therefore an object of the present invention to provide a toilet apparatus adapted to put the excrement produced each time into a bag to form a package of waste, treating the excrement into a state of combustible substance before putting it into a bag.

SUMMARY OF THE INVENTION

According to the present invention, the above object is achieved by providing a toilet apparatus equipped with a long, flexible and folded continuous cylindrical member set in position below a toilet seat as packaging member adapted to receive the excrement produced by the user each time and become sealed and transferred downward in a toilet bowl, a processing material for absorbing liquid and semi-solidifying the excrement being arranged at a side of the toilet apparatus, a quantity of the processing material being fed into the packaging member for receiving the excrement each time of production of excrement so as to absorb liquid from the excrement, the packaging member being subsequently sealed at an opening thereof.

According to the present invention, the processing material arranged at a side of the toilet apparatus may be manually taken out by a quantity suitable for treating the excrement produced at a time and put into the packaging member for receiving the excrement. Alternatively, the processing material may be supplied as packs of doses and a pack of a dose may be supplied into the packaging member receiving the excrement produced at a time.

The processing material may be supplied into a packaging member manually by a producer of the excrement or a nursing attendant or automatically by a mechanical means by a dose at a time.

Thus, according to the present invention, a processing material for absorbing liquid and semi-solidifying the excrement is arranged at a side of the toilet apparatus and a quantity of the processing material is fed into the packaging member for receiving the excrement each time of production of excrement so as to absorb liquid from the excrement. Then, the packaging member is subsequently sealed at the opening thereof. Thus, an agglomeration of the excrement produced at a time as a result of that the liquid content of the excrement is absorbed by the processing material can be handled as ordinary combustible waste.

DETAILED DESCRIPTION OF THE PREFERRED EMBODIMENT

Figure 1:
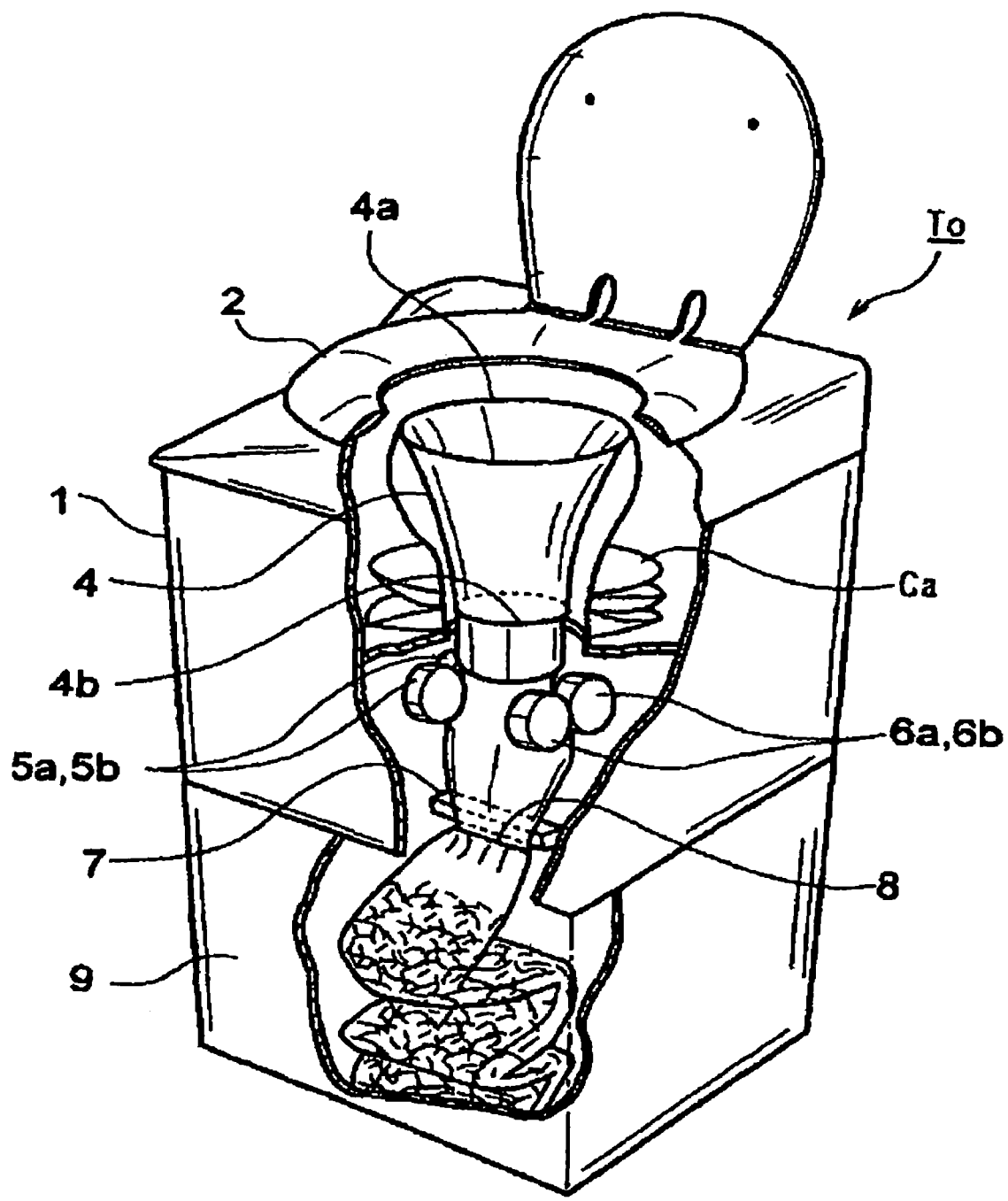
FIG. 1 is a schematic perspective view of an embodiment of toilet apparatus according to the present invention showing features of the invention that are also in the related art.
Figure 2:
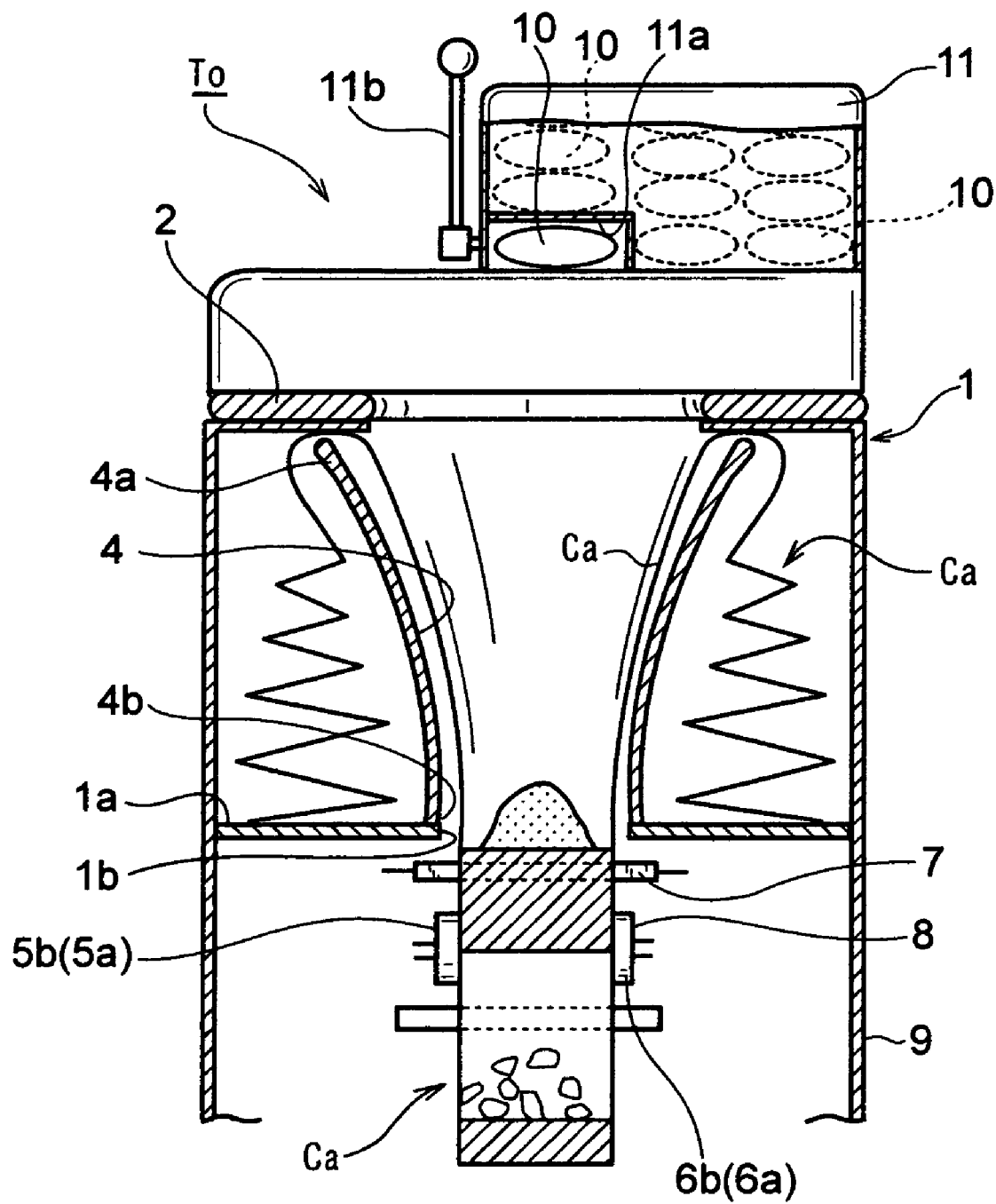
FIG. 2 is a schematic cross-sectional view of a principal part of a toilet apparatus according to the present invention, illustrating the function and the effect of the toilet apparatus.

Now, an embodiment of toilet apparatus according to the present invention is described below by referring to the accompanying drawings. FIG. 1 is a schematic perspective view of an embodiment of toilet apparatus according to the present invention. FIG. 2 is a schematic cross-sectional view of a principal part of a toilet apparatus according to the present invention, illustrating the function and the effect of the toilet apparatus.

In the drawings, reference symbol To generally denotes an embodiment of toilet apparatus according to the present invention that includes a substantially box-shaped toilet main body 1 having an upper part and a lower part with apertures for making them open and provided with a toilet seat 2 and a closure 3 arranged at the upper aperture thereof. The closure 3 can be swung up and down for opening and closing.

A toilet bowl main body 4 is arranged in the inside of the toilet main body 1. The toilet bowl main body 4 is substantially funnel-shaped and has an aperture 4a located vis-á-vis the upper aperture (toilet seat 2) of the main body 1 and another aperture 4b arranged at the bottom thereof and located vis-á-vis the lower aperture of the main body 1.

The funnel-shaped toilet bowl main body 4 is so arranged that its lower aperture 4b is located vis-á-vis the hole 1b cut through the bottom plate 1a of the toilet main body 1 and held in contact with the edge of the hole 1b. A cassette-like folded body Ca of an oblong and flexible plastic tube is arranged on the bottom plate 1a where the lower end of the toilet bowl main body 4 is located so as to surround the toilet bowl main body 4 as packaging member. The folded body Ca (to be also referred to as packaging member Ca hereinafter) that is arranged to surround the toilet bowl main body 4 is extended at the upper end side (front end side) thereof to the edge of the upper aperture 4a and turned (folded) into the inside of the toilet bowl main body 4 at the edge of the aperture. In other words, the front end of the packaging member Ca is drawn in downward relative to the aperture 1b of the bottom plate 1a as shown in FIG. 2.

In the illustrated instance, two pairs of feed rolls 5a, 5b and 6a, 6b are arranged below and at the outside relative to the aperture 1b of the bottom plate 1a in order to pinch the extreme outer edge of the packaging member Ca from the front side and the rear side and draw it downward. A heat sealer 7 is arranged above the feed rolls 5a, 5b and 6a, 6b and below the bottom plate 1a in order to transversally heat seal the packaging member Ca. In the instance illustrated in FIG. 2, a cutter 8 is arranged below the two pairs of feed rolls 5a, 5b and 6a, 6b in order to transversally cut and separate the leading packaging member Ca drawn by the rolls from the remaining packaging members Ca. The heat sealer 7 and the cutter 8 are provided with respective pairs of opposing members for pinching the packaging member Ca from the front side and the rear side in a direction orthogonal to the transversal direction of the packaging member Ca. The pairs of opposing members can be moved back and forth so that the opposing members of each of the pairs come close to each other to pinch the packaging member Ca at the time of a cutting operation or a heat-sealing operation and move away from each other to respective standby positions when the heat sealer 7 or the cutter 8, whichever appropriate, is at rest. Alternatively, the heat sealer 7 and the cutter 8 may be arranged at the same position. In other words, the heat sealer 7 may be such that it operates both for heat-sealing and for cutting the packaging member Ca. Note that the heat sealer 7 and the cutter 8 are arranged at the same position in FIG. 1.

A storage section 9 for storing individual separate packaging members Ca that are heat-sealed and cut by the cutter 8 is arranged below the toilet main body 1 that is provided with the above-described arrangement in the inside. The above-described arrangement is similar to known package type toilet apparatus.

In the instance of a known package type toilet apparatus similar to the one described above, the excrement produced by the user sitting on the toilet seat 2 is received in the packaging member Ca that is sealed along the leading edge to form a bottom by means of the heat sealer 7. Subsequently, the packaging member Ca now containing the excrement is drawn downward by the two pairs of feed rolls 5a, 5b and 6a, 6b and, when the contained excrement passes by the heat sealer 7, the feeding operation is suspended and the heat sealer 7 is operated to seal the aperture of the packaging member Ca that is drawn in. For example, the packaging member Ca may be heat sealed over a wide vertical zone or heat sealed to form two or three seal lines in order to secure the sealing effect. When the sealing operation ends, the feed rolls 5a, 5b and 6a, 6b are made to resume the operation of drawing down the packaging member Ca until the sealed part of the packaging member Ca gets to the cutter 8. When the sealed part of the packaging member Ca gets to the cutter 8, the operation of feeding the packaging member Ca is stopped and the cutter 8 is operated to cut the packaging member Ca containing the excrement from the rest of the packaging member Ca and allowing it to drop into the storage section 9. Among known toilet apparatus of the type under consideration, there are some in which the excrement-containing packaging members Ca are not cut and separated by a cutter 8 but simply stored in the storage section 9.

When excrement-containing packaging members Ca are simply stored in the storage section 9, the raw excrement, that is the excrement excessively rich of liquid, is packed and hence it is very difficult to handle them without further treatments.

In view of this problem, according to the present invention, in a package type toilet apparatus of the above-described type, the packed excrement is turned to be handled as ordinary combustible waste typically by semi-solidifying the excrement immediately after it is produced. This will be described below by referring to FIG. 2.

According to the present invention, a processing material that is a highly moisture-absorbing or hygroscopic organic material in the form of powder or granules such as strained lees of bean-curd (tofu), wood chips or pieces of paper (that may be in the form of paper nappies or urine absorbing pads) is supplied into the inside of the excrement-containing packaging member Ca to semi-solidify the excrement or cause the excrement to gel that is subsequently free from liquid.

For this purpose, according to the present invention, a plurality of treatment bags typically made of paper that can easily be torn and broken, each containing a dose of the processing material, is contained in a cassette container 11 arranged at a rear part of the toilet main body 1 as shown in FIG. 2 and a bag 10 containing a dose of the processing material is supplied into the packaging member Ca in the toilet bowl before or after an excreting action. Then, the bag 10 is torn to bring the processing material in the inside into contact with the excrement so that consequently the processing material absorbs the liquid of the excrement substantially entirely to semi-solidify the excrement.

The packaging member Ca now containing the supplied bag 10 and the excrement together is fed downward as in the case of conventional toilet apparatus and the open end of the packaging member Ca is heat sealed, cut and stored in the storage section 9 as a single packaging member Ca.

Figure 3:
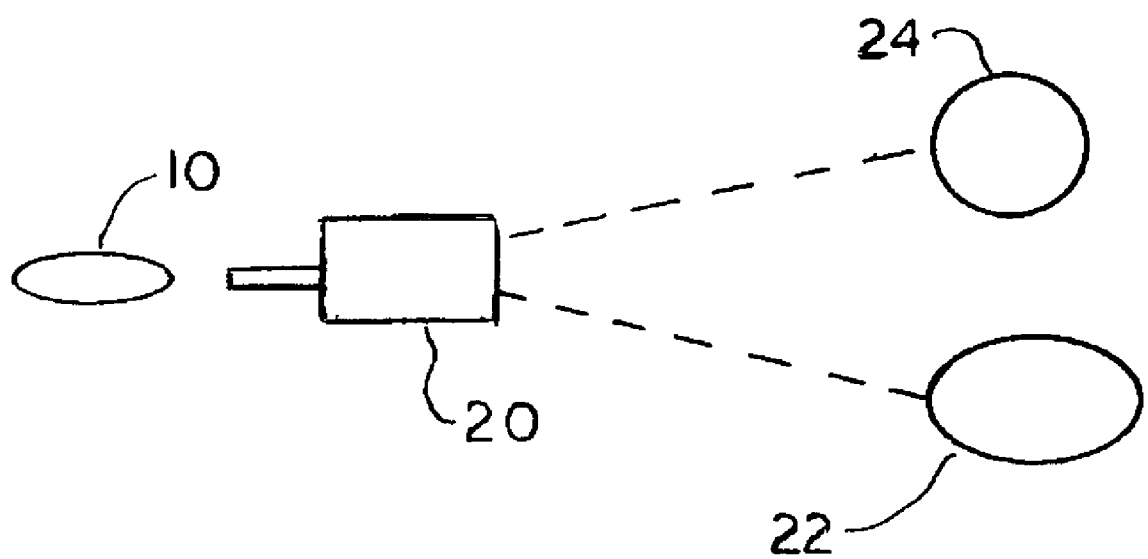
FIG. 3 is a schematic view showing interconnections among a mechanical driver, a sensor, and a start button.

In the instance of FIG. 2, a bag 10 is supplied into the packaging member Ca in the toilet bowl main body before or after an excreting action. The cassette container 11 is provided with a feed port 11a that allows a single bag 10 to move out and a lever 11b for forcing a bag 10 move out. Thus, as the lever 11b is drawn (pushed) down, a single bag 10 is fed out from the feed port 11a by a mechanical driver (not shown in FIG. 2) and drops into the inside of the packaging member Ca in the toilet bowl main body 4 by itself. FIG. 3 shows the mechanical driver 20 to supply the bag 10 into the toilet bowl 4 (not shown in FIG. 3), a sensor 22 coupled to the mechanical driver 20 to automatically supply the processing material into the toilet bowl 4 when the user sits or stands up; and a start button 24 coupled to the mechanical driver 20 to supply the bag 10 into the toilet bowl 4 when the start button is actuated.

For the purpose of the present invention, each bag 10 may be automatically fed out by means of a drive source (not shown) such as a motor or a plunger instead of being fed manually. The drive source may be operated manually by way of a start button or automatically by means of a gravity sensor, a photo-sensor or a magnetic proximity sensor (not shown) that is fitted to the toilet seat 2 to detect a person sitting on the toilet seat 2 or standing up from the toilet seat 2, the detection signal representing the detection serving as trigger for starting the drive source to operate.

As described above, in a toilet apparatus according to the present invention, the excrement contained in the packaging member Ca in the toilet bowl main body 4 and the highly moisture-absorbing hygroscopic organic material-based processing material are brought into contact with each other to semi-solidify the excrement before the packaging member Ca is sealed so that the sealed and semi-solidified excrement can be handled as ordinary combustible waste because the processing material is made of an organic material.

As described above, a toilet apparatus according to the present invention can advantageously find applications in various facilities such as hospitals and houses as a package type toilet apparatus to be installed at a bedside in a room and allows excrements that contain liquid to a large extent to be treated as combustible waste. Thus, the present invention dissolves the problems of conventional toilet apparatus of the type under consideration.

What is claimed is:

1. A toilet apparatus comprising:
   a toilet seat and a toilet bowl;
   a packaging member comprising a long, flexible and folded continuous cylindrical member set in position surrounding the toilet bowl and below the toilet seat, the packaging member being adapted to receive excrement produced by the user and adapted to be subsequently sealed at an opening thereof and transferred downward in the toilet bowl,
   at least one bag of processing material for absorbing liquid and semi-solidifying the excrement, said at least one bag being housed in a cassette holder which is mounted on said toilet bowl,
   a mechanism to feed a bag of the processing material into the packaging member alongside the excrement, at a time of production of the excrement, so as to absorb liquid from the excrement, the packaging member being subsequently sealed at an opening thereof; the mechanism further comprising
   a mechanical driver to supply a bag of the processing material into the toilet bowl, and
   a sensor coupled to the mechanical driver to automatically supply the processing material into the toilet bowl when the user sits on the toilet seat or stands up from the toilet seat.

2. The apparatus according to claim 1, wherein the processing material is highly moisture-absorbing and hydroscopic and in the form of powder, granules, agglomerates, laminates or a mixture of two or more of such forms.

3. The apparatus according to claim 1, wherein the at least one bag of processing material comprises packs of doses and a pack of a dose is fed into the packaging member receiving the excrement produced at a time.

4. The apparatus according to claim 1, wherein the sensor comprises a gravity sensor.

5. The apparatus according to claim 1, wherein the sensor comprises an electro-mechanical sensor.

6. The apparatus according to claim 1, wherein the sensor comprises an electro-optical sensor.

7. The apparatus according to claim 1, wherein the sensor comprises a magneto-electrical sensor.

8. A toilet apparatus comprising:
   a toilet seat and a toilet bowl;
   a packaging member comprising a long, flexible and folded continuous cylindrical member set in position surrounding the toilet bowl and below the toilet seat, the packaging member being adapted to receive excrement produced by the user and adapted to be subsequently sealed at an opening thereof and transferred downward in the toilet bowl,
   at least one bag of processing material for absorbing liquid and semi-solidifying the excrement, said at least one bag being housed in a cassette holder which is mounted on said toilet bowl
   a mechanism to feed a bag of the processing material into the packaging member alongside the excrement, at a time of production of the excrement, so as to absorb liquid from the excrement, the packaging member being subsequently sealed at an opening thereof; the mechanism further comprising
   a mechanical driver to supply a bag of the processing material into the toilet bowl, and
   a start button coupled to the mechanical driver to supply the processing material into the toilet bowl when the start button is actuated.

9. The apparatus according to claim 8, wherein the processing material is highly moisture-absorbing and hydroscopic and in the form of powder, granules, agglomerates, laminates or a mixture of two or more of such forms.

10. The apparatus according to claim 8, wherein the processing material is supplied as packs of doses and a pack of a dose is fed into the packaging member receiving the excrement produced at a time.

11. A toilet apparatus comprising:
    a toilet seat and a toilet bowl;
    a packaging member comprising a long, flexible and folded continuous cylindrical member set in position surrounding the toilet bowl and below the toilet seat, the packaging member being adapted to receive excrement produced by the user and adapted to be subsequently sealed at an opening thereof and transferred downward in the toilet bowl,
    at least one bag of processing material for absorbing liquid and semi-solidifying the excrement, said at least one bag being housed in a cassette holder which is mounted on said toilet bowl,
    a mechanism to feed a bag of the processing material into the packaging member alongside the excrement, at a time of production of the excrement, so as to absorb liquid from the excrement, the packaging member being subsequently sealed at an opening thereof; the mechanism further comprising
    a lever arm operative to supply the quantity of the processing material into the toilet bowl.

12. The apparatus according to claim 11, wherein the processing material is highly moisture-absorbing and hydroscopic and in the form of powder, granules, agglomerates, laminates or a mixture of two or more of such forms.

13. The apparatus according to claim 11, wherein the processing material is supplied as packs of doses and a pack of a dose is fed into the packaging member receiving the excrement produced at a time.

* * * * *